United States Patent [19]
Rosenwald

[11] Patent Number: 6,038,550
[45] Date of Patent: Mar. 14, 2000

[54] METHOD AND APPARATUS FOR MANAGING INTEREST ON A DEVELOPING SERIES OF FINANCIAL TRANSACTIONS IN SEVERAL MEMORIES

[76] Inventor: Jeffrey A. Rosenwald, 8606 Burnt Hickory Cir., Frederick, Md. 21704

[21] Appl. No.: 09/050,997

[22] Filed: Mar. 31, 1998

[51] Int. Cl.[7] .................................................. G06F 17/60
[52] U.S. Cl. ................................ 705/35; 705/37; 707/104
[58] Field of Search .................................. 705/36, 37, 30; 707/104; 708/130

[56] References Cited

U.S. PATENT DOCUMENTS

| | | | |
|---|---|---|---|
| 3,221,156 | 11/1965 | Engstfeld et al. | 235/160 |
| 4,194,242 | 3/1980 | Robbins | 364/200 |
| 4,232,367 | 11/1980 | Youden et al. | 364/408 |
| 4,507,745 | 3/1985 | Agrawal | 364/709 |
| 4,742,457 | 5/1988 | Leon et al. | 364/408 |
| 5,878,404 | 3/1999 | Stout, Jr. et al. | 705/38 |

FOREIGN PATENT DOCUMENTS 9128457  5/1997  Japan ............................ G06F 17/60

OTHER PUBLICATIONS

"TIMSLIPS Anounces Powerful Financial Analysis Tool For Business and Personal Finance", DIALOG(R) File 621:New Prod. Anou. (R) 00254218, Feb. 26.

*Primary Examiner*—Emanuel Todd Voeltz
*Assistant Examiner*—Tongoc Tran
*Attorney, Agent, or Firm*—Griffin, Bulter, Whisenhunt & Szipl, LLP

[57] ABSTRACT

In a method and apparatus for managing and calculating interest on time deposits, loans, and other interest bearing financial instruments, data is stored in several distinct memories. A series of financial transactions is stored in a transaction memory having date and principal amount attributes. Data representing the performance of an investment or loan is stored in an interest factor memory having date, interest factor, and aggregate factor attributes. A displayable interest data memory is populated with interest data synthesized by associating the transaction memory to the interest factor memory by matching corresponding date attributes, then computing the product of the transaction principal amount attribute in the transaction memory and the aggregate factor attribute in the interest factor memory. The interest earned/owed on each transaction is updated each business day and is maintained separately, that is, the interest on each transaction is stored separately from its associated transaction principal amount and from the interest on other transactions.

12 Claims, 6 Drawing Sheets

Microfiche Appendix Included
(1 Microfiche, 17 Pages)

14a 34

Deposit Ticket

| CONTROL NUMBER | ACCOUNT NUMBER | PLAN TYPE |
| --- | --- | --- |
| 216003 | 97-66124-1 | 1 |

| ORGANIZATION | WITHHELD IN QUARTER | OF YEAR |
| --- | --- | --- |
| WEST END AUTOMOTIVE RECYCLERS, INC | ○1 ○2 ●3 ○4 | 1997 |

PLEASE PRINT THE AMOUNT OF YOUR DEPOSIT NEXT TO THE APPROPRIATE FUND(S)
REFER TO THE FUND ADMINISTRATIVE MANUAL SECTION 8 FOR FURTHER DETAILS

| RETIREMENT FUND<br>Employee Deferral or Required Contribution | RETIREMENT FUND<br>$488.78 |
| --- | --- |
| INCOME FUND<br>Employee Voluntary Contribution | INCOME FUND<br>$594.24 |
| PLEASE INDICATE TOTAL DEPOSIT<br>(MAKE CHECK PAYABLE TO FUND DEPOSIT ACCOUNT) | TOTAL DEPOSIT<br>$1,083.02 |

— 38

| IF YOU HAVE ANY QUESTIONS REGARDING YOUR PERIODIC DEPOSITS<br>PLEASE CONTACT THE PLAN INFORMATION CENTER AT 1-800-555-1212 | DATE<br>7/15/97 |
| --- | --- |

— 40

[ |<< ] [ << ] [ < ] [ > ] [ >> ] [ >>| ]   [Store]  [Delete]  [Close]
                                           [New]  [Print]

14c
Interest Tables 58

| Effective Date | Factor |
|---|---|
| 7/30/97 | 0.000120583 |
| 7/31/97 | 0.000121049 |
| 8/1/97 | 0.000360375 |
| 8/4/97 | 0.000120337 |
| 8/5/97 | 0.000120097 |
| 8/6/97 | 0.000120041 |
| 8/7/97 | 0.000120262 |
| 8/8/97 | 0.000358399 |
| 8/11/97 | 0.000120205 |
| 8/12/97 | 0.000119744 |
| 8/13/97 | 0.000120184 |
| Aggregate: | 0.003734208 |

☐ Recompute Aggregates — 72

[ |<< ] [ << ] [ < ] [ > ] [ >> ] [ >>| ]

[ OK ]  [ Cancel ]

FIG. 3

14b
Interest Worksheet

80 — Effective Date: 7/15/97   Thru: 8/14/97 — 82

84 — TOTAL DEPOSIT           $1,083.02

86 — AGGREGATE FACTOR        0.003734208

88 — INTEREST                $4.04

90 — TRANSACTION TOTAL       $1,087.06

92 — [ Cancel ]

FIG. 4

| | A | B | C | D | E | F | G | H | I | J | K | L | M |
|---|---|---|---|---|---|---|---|---|---|---|---|---|---|
| 1 | | | | | | | | | | | | | |
| 2 | Transaction Memory | | | Internal Calculations | | | | Interest Data Memory | | Interest Factor Memory | | | |
| 3 | | | | | | | | | | | | | |
| 4 | Date | Amount | | Amount | | Aggregate Factor | | Interest | | Date | Factor | Aggregate Factor | Compounding Factor |
| 5 | | | | | | | | | | | | | |
| 6 | 7/15/97 | $1083.02 | | $1083.02 | x | 0.003734208 | = | $4.04 | | 7/15/97 | 0.000120539 | 0.003734208 | 1.001680919 |
| 7 | | | | $0.00 | x | 0.003613466 | = | $0.00 | | 7/16/97 | 0.000120606 | 0.003613466 | 1.001680919 |
| 8 | | | | $0.00 | x | 0.003492657 | = | $0.00 | | 7/17/97 | 0.000120511 | 0.003492657 | 1.001680919 |
| 9 | | | | $0.00 | x | 0.003371944 | = | $0.00 | | 7/18/97 | 0.000361494 | 0.003371944 | 1.001680919 |
| 10 | | | | $0.00 | x | 0.003009842 | = | $0.00 | | 7/21/97 | 0.000120541 | 0.003009842 | 1.001680919 |
| 11 | | | | $0.00 | x | 0.002889098 | = | $0.00 | | 7/22/97 | 0.000120627 | 0.002889098 | 1.001680919 |
| 12 | | | | $0.00 | x | 0.002768269 | = | $0.00 | | 7/23/97 | 0.000120474 | 0.002768269 | 1.001680919 |
| 13 | | | | $0.00 | x | 0.002647592 | = | $0.00 | | 7/24/97 | 0.000120551 | 0.002647592 | 1.001680919 |
| 14 | | | | $0.00 | x | 0.002526839 | = | $0.00 | | 7/25/97 | 0.000361764 | 0.002526839 | 1.001680919 |
| 15 | | | | $0.00 | x | 0.002164466 | = | $0.00 | | 7/28/97 | 0.000120546 | 0.002164466 | 1.001680919 |
| 16 | | | | $0.00 | x | 0.002043718 | = | $0.00 | | 7/29/97 | 0.000120558 | 0.002043718 | 1.001680919 |
| 17 | | | | $0.00 | x | 0.001922957 | = | $0.00 | | 7/30/97 | 0.000120583 | 0.001922957 | 1.001680919 |
| 18 | | | | $0.00 | x | 0.001802171 | = | $0.00 | | 7/31/97 | 0.000121049 | 0.001802171 | 1.001680919 |
| 19 | | | | $0.00 | x | 0.001680919 | = | $0.00 | | 8/01/97 | 0.000360675 | 0.001680919 | 1.000000000 |
| 20 | | | | $0.00 | x | 0.001320244 | = | $0.00 | | 8/04/97 | 0.000120337 | 0.001320244 | 1.000000000 |
| 21 | | | | $0.00 | x | 0.001199907 | = | $0.00 | | 8/05/97 | 0.000120097 | 0.001199907 | 1.000000000 |
| 22 | | | | $0.00 | x | 0.001079810 | = | $0.00 | | 8/06/97 | 0.000120041 | 0.001079810 | 1.000000000 |
| 23 | | | | $0.00 | x | 0.000959769 | = | $0.00 | | 8/07/97 | 0.000120262 | 0.000959769 | 1.000000000 |
| 24 | 8/07/97 | ($500.00) | | ($500.00) | x | 0.000959769 | = | ($0.48) | | 8/07/97 | 0.000120262 | 0.000959769 | 1.000000000 |
| 25 | | | | $0.00 | x | 0.000839507 | = | $0.00 | | 8/08/97 | 0.000358399 | 0.000839507 | 1.000000000 |
| 26 | | | | $0.00 | x | 0.000481108 | = | $0.00 | | 8/11/97 | 0.000120205 | 0.000481108 | 1.000000000 |
| 27 | | | | $0.00 | x | 0.000360903 | = | $0.00 | | 8/12/97 | 0.0001119744 | 0.000360903 | 1.000000000 |
| 28 | | | | $0.00 | x | 0.000241159 | = | $0.00 | | 8/13/97 | 0.000120184 | 0.000241159 | 1.000000000 |
| 29 | | | | $0.00 | x | 0.000120975 | = | $0.00 | | 8/14/97 | 0.000120975 | 0.000120975 | 1.000000000 |
| 30 | | | | $583.02 | | | | $3.56 | | | | | |
| 31 | | Account Balance: | | $586.58 | | | | | | | | | |
| 32 | | | | | | | | | | | | | |

FIG. 5

|   | A | B | C | D | E | F | G | H | I | J | K | L | M |
|---|---|---|---|---|---|---|---|---|---|---|---|---|---|
| 1 |   | Transaction Memory |   |   | Internal Calculations |   |   | Interest Data Memory |   |   | Interest Factor Memory |   |   |
| 2 |   |   |   |   |   |   |   |   |   |   |   |   |   |
| 3 |   |   |   |   |   |   |   |   |   |   |   |   |   |
| 4 |   |   |   |   |   |   |   |   |   |   |   |   |   |
| 5 | Date | Amount |   | Amount |   | Aggregate Factor |   | Interest |   | Date | Factor | Aggregate Factor | Compounding Factor |
| 6 |   |   |   |   |   |   |   |   |   |   |   |   |   |
| 7 | 7/15/97 | $1083.02 |   | =B7 | x | =L7 |   | =D7*F7 |   | 7/15/97 | 0.000120539 | =L8 + (K7*M7) | =1 + L$20 |
| 8 |   |   |   | =B8 | x | =L8 |   | =D8*F8 |   | 7/16/97 | 0.000120606 | =L9 + (K8*M8) | =1 + L$20 |
| 9 |   |   |   | =B9 | x | =L9 |   | =D9*F9 |   | 7/17/97 | 0.000120511 | =L10 + (K9*M9) | =1 + L$20 |
| 10 |   |   |   | =B10 | x | =L10 |   | =D10*F10 |   | 7/18/97 | 0.000361494 | =L11 + (K10*M10) | =1 + L$20 |
| 11 |   |   |   | =B11 | x | =L11 |   | =D11*F11 |   | 7/21/97 | 0.000120541 | =L12 + (K11*M11) | =1 + L$20 |
| 12 |   |   |   | =B12 | x | =L12 |   | =D12*F12 |   | 7/22/97 | 0.000120627 | =L13 + (K12*M12) | =1 + L$20 |
| 13 |   |   |   | =B13 | x | =L13 |   | =D13*F13 |   | 7/23/97 | 0.000120474 | =L14 + (K13*M13) | =1 + L$20 |
| 14 |   |   |   | =B14 | x | =L14 |   | =D14*F14 |   | 7/24/97 | 0.000120551 | =L15 + (K14*M14) | =1 + L$20 |
| 15 |   |   |   | =B15 | x | =L15 |   | =D15*F15 |   | 7/25/97 | 0.000361764 | =L16 + (K15*M15) | =1 + L$20 |
| 16 |   |   |   | =B16 | x | =L16 |   | =D16*F16 |   | 7/28/97 | 0.000120546 | =L17 + (K16*M16) | =1 + L$20 |
| 17 |   |   |   | =B17 | x | =L17 |   | =D17*F17 |   | 7/29/97 | 0.000120558 | =L18 + (K17*M17) | =1 + L$20 |
| 18 |   |   |   | =B18 | x | =L18 |   | =D18*F18 |   | 7/30/97 | 0.000120583 | =L19 + (K18*M18) | =1 + L$20 |
| 19 |   |   |   | =B19 | x | =L19 |   | =D19*F19 |   | 7/31/97 | 0.000121049 | =L20 + (K19*M19) | =1 + L$20 |
| 20 |   |   |   | =B20 | x | =L20 |   | =D20*F20 |   | 8/01/97 | 0.000360675 | =L21 + (K20*M20) | 1.000000000 |
| 21 |   |   |   | =B21 | x | =L21 |   | =D21*F21 |   | 8/04/97 | 0.000120337 | =L22 + (K21*M21) | 1.000000000 |
| 22 |   |   |   | =B22 | x | =L22 |   | =D22*F22 |   | 8/05/97 | 0.000120097 | =L23 + (K22*M22) | 1.000000000 |
| 23 |   |   |   | =B23 | x | =L23 |   | =D23*F23 |   | 8/06/97 | 0.000120041 | =L24 + (K23*M23) | 1.000000000 |
| 24 | 8/07/97 | ($500.00) |   | =B24 | x | =L24 |   | =D24*F24 |   | 8/07/97 | 0.000120262 | =L25 + (K24*M24) | 1.000000000 |
| 25 |   |   |   | =B25 | x | =L25 |   | =D25*F25 |   | 8/08/97 | 0.000358399 | =L26 + (K25*M25) | 1.000000000 |
| 26 |   |   |   | =B26 | x | =L26 |   | =D26*F26 |   | 8/11/97 | 0.000120205 | =L27 + (K26*M26) | 1.000000000 |
| 27 |   |   |   | =B27 | x | =L27 |   | =D27*F27 |   | 8/12/97 | 0.000119744 | =L28 + (K27*M27) | 1.000000000 |
| 28 |   |   |   | =B28 | x | =L28 |   | =D28*F28 |   | 8/13/97 | 0.000120184 | =L29 + (K28*M28) | 1.000000000 |
| 29 |   |   |   | =B29 | x | =L29 |   | =D29*F29 |   | 8/14/97 | 0.000120975 | =L30 + (K29*M29) | 1.000000000 |
| 30 |   |   |   | =SUM(D7:D29) |   |   |   | =SUM(H7:H29) |   |   |   |   |   |
| 31 |   | Account Balance: |   | =D30 + H30 |   |   |   |   |   |   |   |   |   |
| 32 |   |   |   |   |   |   |   |   |   |   |   |   |   |

METHOD AND APPARATUS FOR MANAGING INTEREST ON A DEVELOPING SERIES OF FINANCIAL TRANSACTIONS IN SEVERAL MEMORIES

This application includes a microfiche appendix of 17 pages.

FIELD OF THE INVENTION

The present invention relates to a method and apparatus for managing interest on time deposits, loans, and financial instruments whose value changes over time. Transaction amounts and interest factors relating to a developing series of financial transactions are entered into separate memories and calculated interest is stored in a third memory.

BACKGROUND OF THE INVENTION

The conventional method for calculating and managing interest on deposits and loans is dependent upon the maintenance of a state known commonly as the account balance. Credit and debit transactions are posted (added or subtracted) against the account in order to reflect change. Often, this activity must be maintained for a substantial period of time by the institution for historical and tax reporting purposes. The account balance represents the summation of all credits and debits and is thus dependent on all prior activity of an account to date. Periodically, interest is compounded into the account by crediting the account with an amount equal to the product of the account balance on a given date times a factor representing an established interest rate for a given period of time. Each day, month, quarter, and year-end, every account in an institution must be serviced in some way or another, if for no other reason than to accumulate the day's anticipated interest which has been earned but not yet credited. These processes are often time consuming and must be completed for all accounts in an institution before the institution can open for business the next day.

Because the account balance is at all times a summation of all prior debits and credits, including credited interest, and each computation of earned interest is carried out by multiplying the account balance by the applicable interest rate, any error in the account is propagated forward and correction of any error requires a re-calculation of all subsequent transactions.

SUMMARY OF THE INVENTION

An object of the present invention is to provide a method and apparatus for computing the interest on a developing series of external financial transactions by separately storing transaction data, interest factor data, and interest data as entries in a transaction data memory, an interest factor memory and an interest data memory, respectively, storing an associated date attribute with each entry in the transaction data memory and the interest factor memory, and using a memory controller to selectively relate the entries in the various memories by matching corresponding date attributes.

A further object of the invention is to provide an apparatus for managing interest on a developing series of financial transactions in several memories, the apparatus comprising: a transaction memory having a plurality of locations for storing, for each transaction, transaction memory data including the principal amount and an effective date attribute for the principal amount; an interest factor memory for storing, for each interest period, interest factor data including an interest factor, an aggregate factor and a date attribute; an interest data memory having a plurality of locations for storing, at each location, an interest value associated with one of the transactions, each interest value representing the interest earned or owed on the principal amount of its associated transaction from the effective date of the transaction to a present day; a processor means including a data input means, a pointer and an interactive display for entering the transaction memory data into the transaction memory and for entering the interest factor and date attribute into the interest factor memory; the processor further comprising means operable upon each entry of an interest factor and date attribute into the interest factor memory for computing and storing with the interest factor and date attribute an aggregate factor associated with the date attribute, and re-computing all prior aggregate factors in the interest factor memory; and means operable upon entry of each interest factor and date attribute into the interest factor memory for multiplying the principal amount of each transaction in said transaction memory by the aggregate factor in said interest factor memory having a date attribute corresponding to the effective date attribute of the principal transaction and storing the products at locations in the interest data memory.

A further object of the invention is to provide an apparatus as described above wherein the processor means includes means responsive to the pointer and the interactive display for displaying the principal amount of any selected transaction and the interest earned or owed on the transaction from the effective date through the day of the last date attribute stored in the interest factor memory. The interactive display displays soft keys operable by the pointer to select the transaction whose principal amount is displayed. The interactive display displays a menu bar operable by the pointer to open a transaction management display window for controlling entry of the transaction data into said transaction memory, or an interest factor memory display window for controlling entry of the interest factor and date attribute into the interest factor memory.

Yet another object of the invention, is to provide a method and apparatus for calculating the amount of interest earned or owed on a particular transaction in a transaction memory by calculating and storing an aggregate factor attribute in an interest factor memory which represents an aggregation of interest factors over time, relating a transaction in the transaction memory to an aggregate factor in the interest factor memory by way of a corresponding date attribute, calculating the interest earned or owed on the transaction by calculating the product of the principal amount of the transaction in the transaction memory and the aggregate factor in the interest factor memory, and storing the calculated interest earned or owed in an interest data memory.

According to one aspect of the invention, a method of managing interest on a developing series of financial transactions comprises providing first, second and third memories; storing the principal amount of each transaction and the effective date of the transaction in the first memory; each business day, storing interest factor data in the second memory, the interest factor data for succeeding business days being stored at succeeding locations in the interest factor memory, the interest factor data for each day comprising an interest factor and a date attribute; computing an aggregate factor each day and storing the aggregate factor in the interest factor memory at the location in the interest factor memory where the interest factor and date attribute for that day are stored; recomputing the aggregate factors for all previous days after each interest factor and date attribute are stored in the interest factor memory; multiplying each principal amount in the first memory by the aggregate factor in the second memory having a date attribute equal to the effective date of the transaction to derive an interest value; and storing the interest values in the third memory, whereby the third memory at all times stores interest values each representing the interest earned or owed on one of the principal amounts from the effective date of the transaction until a present day. Each aggregate factor is computed or recomputed by establishing an ephemeral compounding factor for storage in said second memory with each date attribute, the compounding factor being computed beginning with the present day and being one plus the aggregate factor for the first day in a next following compounding period, except that if there is no next following compounding period, then the compounding factor has a value of one, and multiplying the interest factor for each day by the compounding factor for the day and adding the next following day's aggregate factor.

Other objects and advantages of the invention will become obvious upon consideration of the following description and the accompanying drawings.

BRIEF DESCRIPTION OF THE DRAWINGS

FIG. 2 shows a transaction memory display window displaying a deposit ticket and soft keys for enabling an operator to perform transaction management operations;

FIG. 3 shows an interest factor memory display window for enabling an operator to perform interest factor management operations;

FIG. 4 shows an interest data memory display window for enabling an operator to retrieve and display the current value of a specific transaction;

FIG. 5 is a table showing typical data entries in the transaction, interest data and interest factor memories, the entries made by a human operator being shown in bold face type and entries computed automatically being shown in normal type;

FIG. 6 is a table similar to FIG. 5 except that the formulae for computing the automatically computed entries are shown; and, FIG. 7 shows a generic computer and illustrates the entry of data developed, by way of pre-computer activity, into the computer by a human operator.

DESCRIPTION OF A PREFERRED EMBODIMENT

Figure 7:
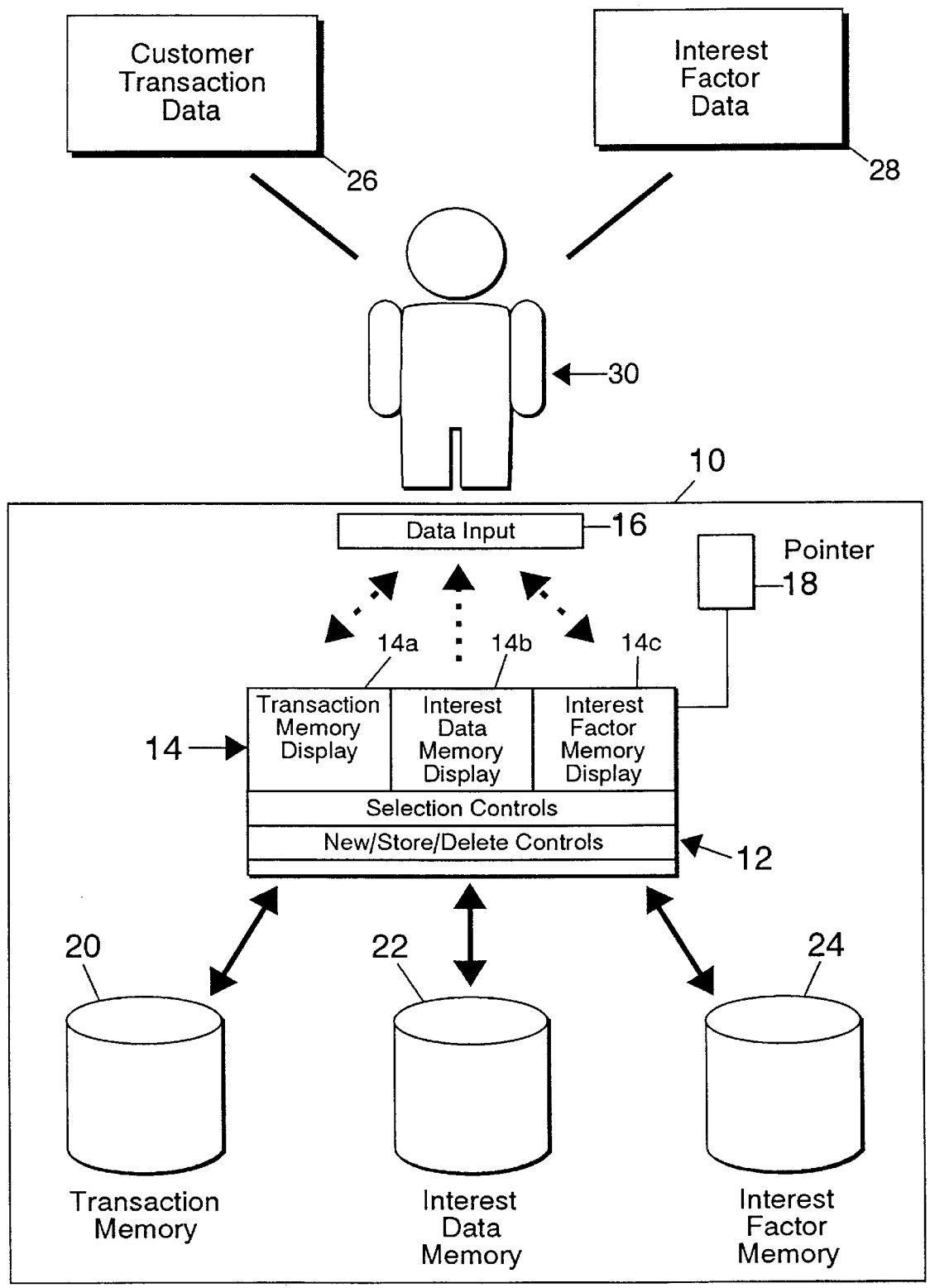

Referring to FIG. 7, the invention is implemented in a computer or data processing system 10 of conventional design in that it comprises a central processor unit and memory controller 12 including a monitor or interactive video display 14, a data input means such as a keyboard 16, a mouse or other pointer 18 for moving a cursor over the display, and memory means illustrated as a transaction memory 20, an interest data memory 22 and an interest factor memory 24. The memory means is illustrated as three physically separate memories to simplify the explanation of the invention. In actual practice the memories 20, 22 and 24 may comprise separate tables within a single physical memory.

According to the present invention, transaction data 26 and interest factor data 28 resulting from a developing series of financial transactions is entered into system 10 by a human operator 30 utilizing keyboard 16, pointer 18 and the monitor or interactive video display 14. The monitor 14 continuously displays a menu screen or window 14d (FIG. 1) having thereon a menu bar 32. Using the pointer 18, the operator may select one of the options 'Deposits', 'Interest' or 'Worksheet' on the menu bar to open one of three windows, the open window being displayed beneath the menu bar.

When 'Deposits' is selected, a transaction management window 14a (FIG. 2) is opened to enable the operator to perform a transaction management operation. Transaction management is the process of recording or modifying transaction events in transaction memory 20 using the transaction memory display window 14a, keyboard 16, pointer 18 and control means in the form of various soft keys displayed in the window.

When 'Interest' is selected on the menu bar 32, an interest factor memory display window 14c (FIG. 3) is opened to enable the operator to perform an interest factor management operation. Interest factor management is the process of recording data representative of the performance of an external financial instrument, such as an investment or loan, in interest factor memory 24 using interest factor memory display window 14c, keyboard 16, pointer 18 and soft keys displayed in the window.

When 'Worksheet' is selected on the menu bar 32, an interest data memory display window 14b (FIG. 4) is opened to enable the operator to perform an interest data display operation. An interest data display operation is the process of retrieving and displaying, via the interest data memory display window 14b and keyboard 16, the current value (principal and interest) of a specific transaction stored in the transaction memory 20.

According to the present invention, an account is maintained as a developing series of discrete transactions entered in transaction memory 20. Each transaction memory entry minimally comprises the date of the transaction, and the principal amount of the transaction. The separate memory 24 is maintained for interest factors, each entry in this memory minimally comprising an effective date attribute, an interest factor attribute which represents, for that particular day, the performance of an external financial instrument such as an investment or loan, and an aggregate factor attribute, derived as later described, that represents the performance of the instrument over time from the effective date of the instrument forward to the present day.

Transaction Management

The transaction memory 20 is embodied as a table in a relational data base which stores data representative of a developing series of financial transactions, minimally having date and principal amount attributes, in an adjacent series of storage locations. Control over the memory 20 is exercised by way of the transaction memory display window 14a and soft keys displayed in the window.

The display window 14a displays a form 34 illustrated in FIG. 2 as an image of a deposit ticket having boxes in which data appears as it is entered into the system via keyboard 16. However, the format of form 34 may vary depending on the type of financial transaction the data relates to, that is, whether the data relates to a transaction concerning a loan, savings account, etc. Display window 14a also displays various selection or control means in the form of soft keys, operable by the pointer 18, which permit the operator to initiate various control operations or select a particular location in the transaction memory 20.

Transaction data relating to a new transaction may be entered into the transaction memory 20 when window 14a is open and the operator uses the pointer 18 to actuate the New control key 36 in the window. After selection of New, the operator types in the transaction data using keyboard 16. If the transaction memory 20 is to store transaction data relating to a single developing series of financial transactions, the transaction data must include at least a transaction amount which appears in box 38 on form 34 and a date which appears in box 40 as the data is typed. On the other hand, if the memory 20 is to store transaction data relating to two or more developing series of financial transactions, the transaction data must further include an account identifier such as an account name or number. To simplify explanation of the invention the following description assumes that all transactions relate to a developing series of transactions relating to a single account.

After the transaction data has been entered, the operator actuates the Store control key 52 using pointer 18. This causes the data displayed in the form 34 be recorded in the transaction memory location which is adjacent the last location holding transaction data.

The operator may cause the transaction data stored at any location in transaction memory 20 to be displayed in form 34. Six data selection controls or soft keys 45–50 are used in conjunction with pointer 18 to select the location whose contents are to be displayed. Key 45 selects the first location in transaction memory 20; key 46 selects the location that is sixteen locations back from the current location; key 47 selects the location that is one location back from the current location; key 48 selects the location that is one location forward from the current location; key 49 selects the location that is forward sixteen locations relative to the current location; and key 50 selects the last location in the transaction memory 20. As the operator operates keys 45–50 with the pointer, the transaction data is read from memory 20 and displayed in form 34.

Once the transaction data is displayed in form 34, it may be edited or completely deleted. To edit displayed transaction data, the operator uses the pointer 18 to select the data in form 34 to be edited, and the keyboard 16 is used to edit the data. The operator then actuates a Store control key 52. This causes the displayed (edited) transaction data to be stored in the transaction memory location from which the original data was read.

Transaction data relating to an existing transaction may be completely deleted from the transaction memory 20 once it is called up for display in form 34. When the operator actuates a Delete soft key 54 on the transaction memory display window 14a, the data displayed in the image of form 34 is erased and this data is deleted from the transaction memory.

As long as window 14a is open, an operator may carry out transaction data entries, editing and/or deletions by following the procedures described above. When no further entries, editing and/or deletions are required, the Close soft key 56 displayed in window 14a may be actuated to close the window.

Interest Factor Management

The interest factor memory display window 14c (FIG. 3) provides the controls for controlling the entry of data into the interest factor memory 24. The interest factor memory is embodied as a table in a relational data base capable of storing, in an adjacent series of locations, data representative of a developing series of interest factors. The interest factor data stored at each location has date, interest factor, and aggregate factor attributes.

The interest factor represents the performance of a transaction e.g. the interest earned or owed on the transaction for one business day or, in the case of week-ends or holidays, the interest earned for the business day and the week-end days or holidays following the business day. The aggregate factor is a value which takes into account interest compounding and, when multiplied by the principal amount of a transaction, yields the interest attributable to the transaction from the effective date of the transaction to the current day. The effective date of the transaction is the date interest begins to accumulate on the transaction.

Figure 1:
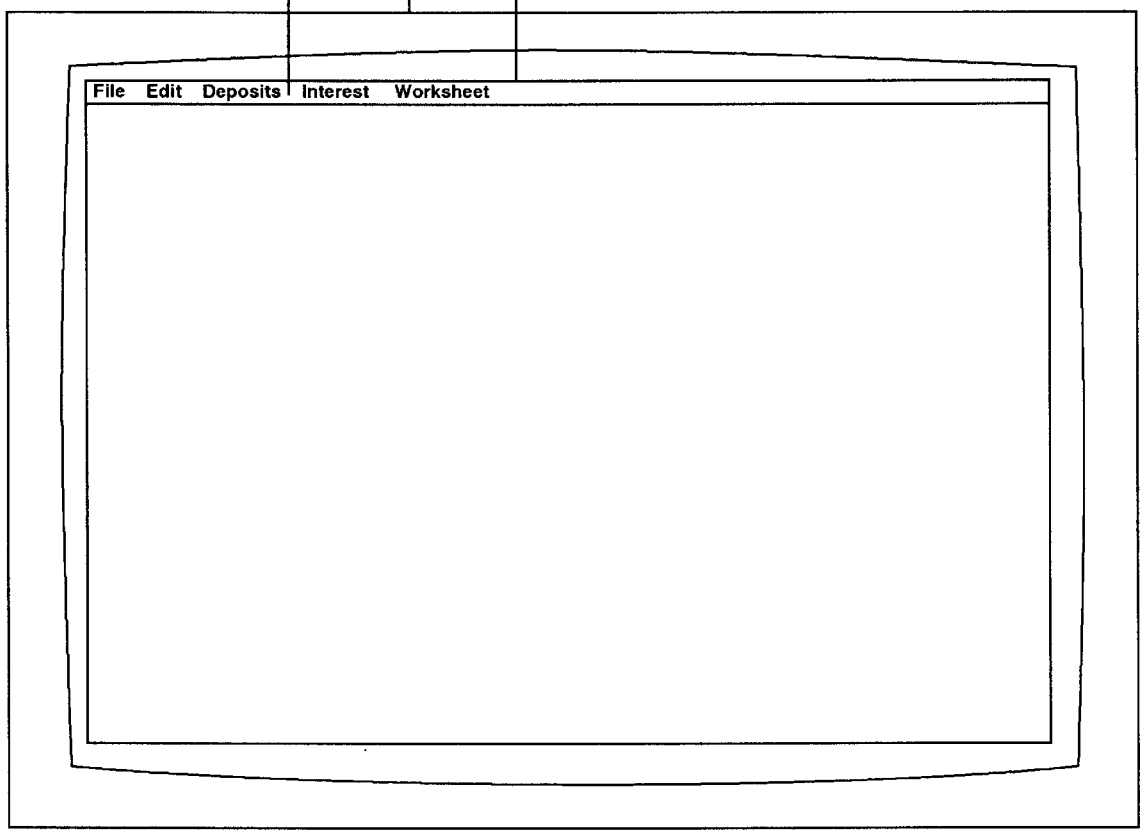
FIG. 1 shows an interactive video display window having a menu bar thereon.

Referring to FIG. 1, operator 30 uses the pointer 18 to select 'Interest' from the menu bar 32. This causes the interest factor memory display window 14c to appear on the screen of monitor 14. This window displays an interest table 58 having therein the effective date and interest factor stored in several of the last locations in memory 24, and an aggregate factor 59. Window 14c also displays a plurality of selection and control keys including memory location selection keys 60–65, an OK key 66 and a Cancel key 68.

Exactly one interest factor is stored in memory 24 for each business day. To enter interest factor data into the interest factor memory, the operator selects the bottom or last location in the interest factor memory using the pointer 18 and selection control soft keys 60–65. Keys 60–65 function in the same way as keys 45–50 (FIG. 2) and enable the operator to select a specific location in the interest factor memory. The last location in the interest factor memory is always empty thus facilitating entry of new interest factors. The contents of this memory location are displayed at location 70 in the interest table 58. Each business day the operator stores one and only one interest factor by filling in, via keyboard 16 and window 14c, the last location with the date and the interest factor for that date. The aggregate factor and compounding factor in each interest factor location are not entered by the operator but are instead computed by processor 12 as subsequently described.

Any change on the interest factor display window 14c is stored in the interest factor memory 24 when the change occurs, that is, when the cursor of the display is moved elsewhere on the display. All aggregate factors in the interest factor memory are automatically recalculated by processor 12 when the interest factor memory display window 14c is closed by actuating the OK control key 66. The operator may also initiate recalculation of aggregate factors by actuating the Recompute Aggregates key 72, followed by actuating the OK control key 66. Actuating the Cancel control key 68 closes the interest factor memory display window in the same way as the OK control, except that any uncommitted (eg unstored) changes are abandoned.

The aggregate factor 59 displayed in FIG. 3 depends on the effective date selected by the operator using keys 60–65. FIG. 3 illustrates the condition where an operator has selected the effective date Jul. 15, 1997. The aggregate factor 59 thus indicates the performance through Aug. 14, 1997 of any transaction having an effective date of Jul. 15, 1997.

Calculation of Aggregate Factors

The table shown in FIG. 5 illustrates a numerical example of an account wherein it is assumed that interest is credited daily and compounded monthly at the end of the month. FIG. 5 provides a 'snapshot' of the values in the transaction, interest factor and interest data memories after the entry has been made in the interest factor memory on Aug. 14, 1997. In the following description, letters and numbers in parentheses refer to the columns and line numbers in the table.

Each line of the table (lines 7–29) indicates the contents of a memory location in transaction memory 20 (A and B), the interest data memory 22 (H) and the interest factor memory 24 (J,K,L and M) on the current or present day which is assumed to be Aug. 14, 1997.

The data shown in FIG. 5 is developed as follows. Each day an operator enters the day's date (J) and the interest factor (K) for that date into the interest factor memory 24 via window 14c (FIG. 3). The interest factor is the interest rate for the one day. Each time a new date and interest factor are stored in a location in the interest factor memory 24, the processor 12 calculates a compounding factor (M) and an aggregate factor (L) which are stored with the interest factor. Processor 12 also recalculates any compounding factors and aggregate factors for previous days and updates these factors in the interest factor memory.

The aggregate factors are determined according to the formulae shown in FIG. 6. Beginning from the present day and working backwards in time, the aggregate factor for each day or row in the interest factor memory is calculated by:

(a) establishing the value of an ephemeral compounding factor (M) for the compounding period, where this value is computed as one plus the aggregate factor (L) for the first day in the next proceeding or following compounding period, except if there is no next following compounding period, then the compounding factor for the compounding period will have a value of one, and (b) calculating the aggregate factor as the product of the interest factor (K) and the compounding factor (M) for the day, plus the next following day's aggregate factor (L).

In FIG. 5, it should be obvious that the foregoing algorithm results in a change in the aggregate factors stored in the interest factor memory each business day when that day's interest factor is entered. Furthermore, the compounding factor changes upon entry of the interest factor for the first business day of a new compounding period.

FIG. 5 shows two transactions assumed to be transactions in a savings account. The first transaction takes place on Jul. 15, 1997, the effective date, and is a credit (e.g) a deposit in the principal amount of $1083.02. When this transaction data (A7 and B7) is entered into the transaction memory 20 via window 14a (FIG. 2) as previously described, processor 12 obtains the aggregate factor (L7) for the effective date (J7) then present in the interest factor memory and multiplies the principal amount by the aggregate factor. The resulting interest value (H7), representing interest earned on the transaction from the effective date to the present day, is stored in the interest data memory 22.

Each business day subsequent to Jul. 15, 1997, the day's date (J) and the interest factor (K) for that day are stored in the interest factor memory using window 14c (FIG. 3) as previously described. When the interest factor (K) is stored, processor 12 computes the compounding factor (M) and aggregate factor (L) for that day and also recalculates the compounding and aggregate factors for all previous days. The principal amount (B7) is multiplied by the updated aggregate factor (L7) to update the interest value (H7) in the interest value memory until, on Aug. 14, 1997, the updated interest value (H7) stored in the interest data memory for the transaction is $4.04. This means that the principal amount deposited on Jul. 15, 1997 would potentially earn $4.04 in interest if left in the account until the present day.

The second transaction is assumed to be a debit (e.g. a withdrawal) on Aug. 7, 1997, the principal amount being $500.00. It is managed in the same way as the first transaction. That is, when the operator enters the transaction data (A24 and B24) into the transaction memory using window 14a, the processor 12 multiplies the principal amount (B24) by the aggregate factor (L24) then present in the interest factor memory and stores the result in the interest data memory (H24). Since the principal amount is a negative number, the interest value (H24) is a negative number.

Each succeeding business day after Aug. 7, 1997 a new interest value is computed using the new aggregate factor (L24), the result being used to update the entry (H24) in the interest data memory. On Aug. 14, 1997 the interest value (H24) is −$0.48.

From the description of FIG. 5 it is evident that each transaction is treated separately and either earns or is charged interest depending on whether the transaction is a credit or a debit to the account. Furthermore, the interest earned or charged to a transaction is stored separately from the principal amount of the transaction. This greatly simplifies the correction of errors. For example, if the principal amount B7 in FIG. 5 is incorrectly entered and the error is not discovered until say Aug. 14, 1997, the error may be corrected by bringing the transaction up for display in window 14a (FIG. 2) and entering the correct principal amount as described above. When the Store key is actuated to store the correct principal amount, processor 12 automatically computes and stores the correct interest amount (H7) in the interest data memory. No further correction in the account is required to account for interest compounding because the aggregate factor (F7) takes this into account.

The processor 12 includes means for calculating an account balance. The account balance is simply the summation of all transactions and associated interest for an account, this being well within the capabilities of current relational data base technology. With respect to the account illustrated in FIG. 5, the processor sums the transaction memory amounts B7 and B24 with the interest data amounts H7 and H24 to obtain an account balance representing an amount which must be paid to settle the account.

Interest Data Display

The interest data memory 22 is embodied as a table in a relational data base capable of storing data representative of a developing series of interest data minimally consisting of an interest attribute and an attribute uniquely associating the interest data to a transaction in the transaction memory. The interest attributable to a particular transaction and the current value of the transaction, including interest, may be displayed on the screen of monitor 14 by first using selection keys 45–50 in the transaction management window 14a (FIG. 2) to select the transaction, and then selecting 'Worksheet' on the menu bar 32 (FIG. 1) which is displayed above window 14a. When 'Worksheet' is selected, the worksheet window 14b (FIG. 4) appears on the screen of monitor 14.

When the worksheet appears on the monitor screen, it displays the effective date of the selected transaction (box 80), a 'Thru' date (box 82), and several values including a total deposit (box 84), an aggregate factor (box 86), interest (box 88) and a transaction total (box 90). The values shown in the various boxes assume that the transaction of Jul. 15, 1997 has been selected and, at the time window 14b is opened, the date and interest factors from Jul. 15, 1997 through Aug. 14, 1997 have been entered in the interest factor memory by the operator.

Referring to FIG. 4 and 5, processor 12 retrieves the effective date (A7) and transaction principal amount (B7) from the transaction memory for display in boxes 80 and 84, respectively. The 'Thru' date displayed in box 82 is the date of the most recent entry in the interest factor memory and in the present example this is the interest factor date at (J29) in the interest factor memory. The aggregate factor displayed in box 86 is obtained from the interest factor memory (L7) and is the aggregate factor for the effective date on the Thru date. The interest value displayed in box 88 is obtained from the interest data memory (H7) and represents the interest attributable to the selected transaction for the period from its effective date through the Thru date.

When window 14b is opened, processor 12 adds the deposit value (box 84) and the interest value (box 88) to display in box 90 the total value of the transaction as of the Thru date.

Window 14b may be closed by actuating a Cancel soft key 92 displayed in the window.

Internal Relationship Between the Memories

Although the numerical example represented in FIG. 5 shows only one transaction on any given day, there is an N to 1 relationship between the transaction memory and the interest factor memory. That is to say, there can be an arbitrary number of transactions in the transaction memory corresponding to a single interest factor memory entry. It is only necessary to find in the interest factor memory the entry having a date (column J in FIG. 5) matching the date (column A) of the transaction, the transaction amount then being multiplied by the aggregate factor (column L) stored in this entry to obtain the interest value (column H) that is stored in the interest data memory. Because a date and interest factor are entered each day, the interest factor memory contains an effective date, interest factor, aggregate factor and compounding factor for each business day. On the other hand, for a given account the transaction memory and interest data memory contains entries only for those days where a transaction amount is entered for the account, with each entry comprising a transaction amount and an effective date.

In the foregoing description, a common date attribute is used by way of illustration to relate the transaction memory to the interest factor memory. All that is required is a common attribute providing sufficient information to reliably join the transaction memory to the interest factor memory. Thus, it is possible to compute interest annually, quarterly, monthly, weekly, or over any period. Furthermore, the method is adaptable to the compounding of interest at intervals other than monthly as used in the illustrated example of FIG. 5.

Advantages of the Present Invention over Prior Art

As compared to the prior art, the present invention provides the following advantages:

(a) the reliability and robustness of systems embodying the invention is vastly improved since the interest earned is not commingled with the principal thus facilitating faster recovery from accounting error or system failure;

(b) the critical time period of the interest compounding cycle during which system failure is disastrous is much shorter since the critical period is proportional to the size of the interest factor memory, not the transaction memory;

(c) the wasteful and time consuming process of transaction roll-back as a means of error recovery is practically eliminated;

(d) the transaction memory and the interest factor memory can be audited and maintained independently from one another, thus contributing significantly to the security and integrity of both;

(e) the stateless nature of the transaction memory enables easy recovery from accounting errors or system failures by making it possible to correct transaction accounting without having to discard or rework transactions entered subsequently;

(f) interest is never commingled with principal so the cost basis of a transaction is always known;

(g) interest accounting can be audited and corrected independently of the transaction memory thus simplifying interest memory corrections due to accounting error or other cause;

(h) each transaction stands alone in its relationship to the interest memory and is independent of other transactions so an error in a prior transaction will not propagate forward to other transactions;

(i) an account that has no activity requires no additional processing;

(j) business need not stop until the interest processing has been audited and completed since interest management is now relegated to a reporting function that can be carried out in parallel with other activities;

(k) backdated and postdated, "as-of", style corrections to the transaction memory are simplified since a change in transaction date will automatically and correctly compute interest earned on the transaction regardless of the timing of the correction; and (l) extremely high-performance, non-stop, systems can be readily achieved, thus enabling high volume activity to occur safely and reliably.

In the preferred embodiment of the invention described above, windows 14a–14c are separately displayed on the screen on monitor 14. However, the three windows may be displayed simultaneously, and opened one at a time using the menu bar.

In the preferred embodiment described above, the interest data memory is embodied as a physical table in a relational database. The interest data memory could also be embodied as a view (eg virtual table) in a relational database.

Other modifications and substitutions falling within the scope of the invention as claimed will be obvious to those skilled in the art.

Appendix

The appended program will control an IBM-compatible PC to carry out the operations described above.

I claim:

1. An apparatus for managing interest on a developing series of financial transactions in several memories, said apparatus comprising:

a transaction memory having a plurality of locations for storing, for each transaction, transaction memory data including the principal amount and an effective date attribute for said principal amount;

an interest factor memory for storing, for each interest period, interest factor data including an interest factor, an aggregate factor and a date attribute;

an interest data memory having a plurality of locations for storing, at each location, an interest value associated with one of said transactions, each interest value representing the interest earned or owed on the principal amount of its associated transaction from the effective date of the transaction to a present day;

a processor means including a data input means, a pointer and an interactive display for entering said transaction memory data into said transaction memory and for entering said interest factor and date attribute into said interest factor memory;

said processor further comprising, means operable upon each entry of an interest factor and date attribute into said interest factor memory for computing and storing with said interest factor and date attribute an aggregate factor associated with the date attribute, and re-computing all prior aggregate factors in said interest factor memory; and, means operable upon entry of each interest factor and date attribute into said interest factor memory for multiplying the principal amount of each transaction in said transaction memory by the aggregate factor in said interest factor memory having a date attribute corresponding to the effective date attribute of the transaction and storing the products at locations in said interest data memory.

2. An apparatus as claimed in claim 1 wherein said processor includes means for establishing an ephemeral compounding factor for storage in said interest factor memory with each date attribute, said compounding factor being computed beginning with the present day and being one plus the aggregate factor for the first day in the next following compounding period, except that if there is no next following compounding period, then the compounding factor has a value of one, said processor means calculating each aggregate factor as the product of the interest factor and the compounding factor for the day, plus the next following day's aggregate factor.

3. Apparatus as claimed in claim 1 wherein said processor means includes means responsive to said pointer and said interactive display for displaying the principal amount of any selected transaction and the interest earned or owed on the transaction from the effective date through the day of the last date attribute stored in said interest factor memory.

4. Apparatus as claimed in claim 3 wherein said interactive display displays soft keys operable by said pointer to select the transaction whose principal amount is displayed.

5. Apparatus as claimed in claim 1 wherein said interactive display displays a menu bar operable by said pointer to open a transaction management display window for controlling entry of said transaction data into said transaction window, or an interest factor memory display window for controlling entry of said interest factor and date attribute into said interest factor memory.

6. Apparatus as claimed in claim 5 wherein said transaction management display window displays transaction data entered via said data input means and further displays a plurality of selection soft keys operable by said pointer to select a location in said transaction memory and a plurality of control soft keys for initiating operation of said processor to store in the selected location transaction data displayed in the transaction management display window, or delete transaction data from the selected location.

7. A method of managing interest on a developing series of financial transactions relating to an account, said method comprising:

providing a transaction memory, an interest factor memory and an interest data memory;

storing the principal amount of each transaction and the effective date of the transaction in the transaction memory;

each business day, storing interest factor data in the interest factor memory, the interest factor data for succeeding business days being stored at succeeding locations in the interest factor memory, the interest factor data for each day comprising an interest factor and a date attribute;

computing an aggregate factor each day and storing the aggregate factor in the interest factor memory at the location in the interest factor memory where the interest factor and date attribute for said day are stored;

recomputing the aggregate factors for all previous days after each interest factor and date attribute are stored in said interest factor memory;

multiplying each principal amount in said first memory by the aggregate factor in said second memory having a date attribute equal to the effective date of the transaction to compute an interest value for each principal amount, each interest value representing the interest earned or owed on a respective principal amount from the effective date of the respective principal amount until a present day and, storing the computed interest values in said interest data memory, whereby said third memory at all times stores interest values each representing the interest earned or owed on one of the principal amounts from the effective date of the transaction until a present day.

8. A method as claimed in claim 7 wherein each aggregate factor is computed or recomputed by:

establishing an ephemeral compounding factor for storage in said second memory with each date attribute, said compounding factor being computed beginning with the present day and being one plus the aggregate factor for the first day in a next following compounding period, except that if there is no next following compounding period, then the compounding factor has a value of one; and, multiplying the interest factor for each day by the compounding factor for the day and adding the next following day's aggregate factor.

9. A method as claimed in claim 7 and further comprising, on a present day, summing said principal amounts and their respective interest values to obtain an account balance representing the value of the account on said present day.

10. Apparatus for computing interest on a developing series of financial transactions in several memories, said apparatus comprising:

a transaction memory, an interest factor memory and an interest data memory;

processor means including an interactive display means for controlling the transaction memory, interest factor memory and interest data memory;

a pointer manipulated by a human operator and interacting with said display means to cause said display means to selectively display a transaction memory display window, an interest data memory display window, or an interest factor memory display window;

a data input means for inputting transaction data and interest factor data representative of a series of financial transactions, the transaction data including, for each transaction, at least a principal amount and a date attribute and the interest factor data including, for each transaction, an interest factor and a date attribute;

said processing means being operable to store said transaction data in said transaction memory in response to the interactive display when the interactive display is displaying the transaction memory display window; and, said processing means being operable to store said interest factor data in said interest factor memory in response to the interactive display when the interactive display is displaying the interest factor memory display window.

11. An apparatus for managing interest on a developing series of financial transactions relating to an account, said apparatus comprising:

a transaction memory having a plurality of locations for storing, for each transaction, transaction memory data including the principal amount and an effective date attribute for said principal amount;

an interest factor memory for storing, for each interest period, interest factor data including an interest factor, an aggregate factor and a date attribute;

an interest data memory having a plurality of locations for storing, at each location, an interest value associated with one of said transactions, each interest value representing the interest earned or owed on the principal amount of its associated transaction from the effective date of the transaction to a present day;

a processor including input means for entering said transaction memory data into said transaction memory and for entering said interest factor and date attribute into said interest factor memory;

said processor further comprising, means operable upon each entry of an interest factor and date attribute into said interest factor memory for computing and storing with said interest factor and date attribute an aggregate factor associated with the date attribute, and re-computing all prior aggregate factors in said interest factor memory;

means operable upon entry of each interest factor and date attribute into said interest factor memory for multiplying the principal amount of each transaction in said transaction memory by the aggregate factor in said interest factor memory having a date attribute corresponding to the effective date attribute of the transaction and storing the resulting interest values at locations in said interest data memory; and, means for summing the interest values on a present day to determine the total interest due on said principal amounts from the respective effective dates of said transactions to said present day.

12. An apparatus as claimed in claim 11 wherein said processor includes means for establishing an ephemeral compounding factor for storage in said interest factor memory with each date attribute, said compounding factor being computed beginning with the present day and being one plus the aggregate factor for the first day in the next following compounding period, except that if there is no next following compounding period, then the compounding factor has a value of one, said processor means calculating each aggregate factor as the product of the interest factor and the compounding factor for the day, plus the next following day's aggregate factor.

* * * * *